(12) United States Patent
Brock et al.

(10) Patent No.: US 10,002,212 B2
(45) Date of Patent: *Jun. 19, 2018

(54) VIRTUAL POWER MANAGEMENT MULTIPROCESSOR SYSTEM SIMULATION

(71) Applicant: International Business Machines Corporation, Armonk, NY (US)

(72) Inventors: Bishop Brock, Coupland, TX (US); Michael S. Floyd, Cedar Park, TX (US); Erika Gunadi, Los Gatos, CA (US); Nan Ni, Austin, TX (US); Srinivasan Ramani, Cary, NC (US); Ken V. Vu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/377,309

(22) Filed: Dec. 13, 2016

(65) Prior Publication Data

US 2017/0091357 A1 Mar. 30, 2017

Related U.S. Application Data

(63) Continuation of application No. 14/040,620, filed on Sep. 28, 2013, now Pat. No. 9,563,724.

(51) Int. Cl.
G06F 17/50 (2006.01)

(52) U.S. Cl.
CPC ...... G06F 17/5009 (2013.01); G06F 17/5036 (2013.01); *G06F 2217/78* (2013.01); *G06F 2217/80* (2013.01)

(58) Field of Classification Search
CPC ............ G06F 17/5009; G06F 2217/78; G06F 2217/80
See application file for complete search history.

(56) References Cited

U.S. PATENT DOCUMENTS

2006/0080625 A1 4/2006 Bose et al.
2007/0276645 A1 11/2007 Veller et al.
(Continued)

FOREIGN PATENT DOCUMENTS

CN 202167021 3/2012
JP 2002334128 11/2002
WO 2007067064 6/2007

OTHER PUBLICATIONS

"U.S. Appl. No. 14/040,620 Final Office Action", dated May 10, 2016, 21 pages.
(Continued)

*Primary Examiner* — Mohammed Rehman
*Assistant Examiner* — Alyaa T Mazyad
(74) *Attorney, Agent, or Firm* — DeLizio Law, PLLC

(57) ABSTRACT

A model-based virtual power management driven multi-chip system simulator generates utilization data and performance data with a workload model that models one or more types of workloads based on parameters that characterize the one or more types of workloads. The simulator generates thermal data and power consumption data with a power model that models power consumption at a chip-level and a system-level. The simulator then generates performance counter information with a performance model that models change of performance counters over time and at least one of the generated utilization data and the generated performance data as input to the performance model. The simulator provides this generated data as input to a driver of the simulator.

8 Claims, 5 Drawing Sheets

(56) References Cited

U.S. PATENT DOCUMENTS

| | | |
|---|---|---|
| 2008/0262824 A1 | 10/2008 | Oslake et al. |
| 2010/0153763 A1 | 6/2010 | Sood |
| 2010/0180275 A1 | 7/2010 | Neogi et al. |
| 2010/0235654 A1 | 9/2010 | Malik et al. |
| 2011/0172984 A1 | 7/2011 | Cher et al. |
| 2011/0213997 A1 | 9/2011 | Kansal et al. |
| 2011/0264418 A1 | 10/2011 | Szewezyk et al. |
| 2011/0264938 A1 | 10/2011 | Henroid et al. |
| 2013/0124885 A1 | 5/2013 | Davis et al. |
| 2013/0238912 A1 | 9/2013 | Priel et al. |
| 2016/0124443 A1* | 5/2016 | Reda .................. G05D 23/1917 700/282 |
| 2017/0285700 A1* | 10/2017 | Cartagena ............... G06F 1/206 |

OTHER PUBLICATIONS

"U.S. Appl. No. 14/040,620 Final Office Action", dated Aug. 26, 2015, 19 pages.
"U.S. Appl. No. 14/040,620 Office Action", dated Jun. 5, 2015, 15 pages.
"U.S. Appl. No. 14/040,620 Office Action", dated Dec. 31, 2015, 22 Pages.
"U.S. Appl. No. 14/066,986 Final Office Action", dated May 10, 2016, 13 pages.
"U.S. Appl. No. 14/066,986 Final Office Action", dated Sep. 21, 2015, 10 pages.
"U.S. Appl. No. 14/066,986 Office Action", dated Jan. 12, 2016, 12 pages.
"U.S. Appl. No. 14/066,986 Office Action", dated May 19, 2015, 9 pages.
Bartolini, et al., "A virtual platform environment for exploring power, thermal and reliability management control strategies in high-performance multicores.", In Proceedings of the 20th Great Lakes symposium on VLSI (GLSVLSI 10), May 2010, 20 pages.
Brooks, et al., "Wattch: A Framework for Architectural-Level Power Analysis and Optimizations", In Proceedings of the 33rd Annual International Symposium of Computer Architecture, IEEE Computer Society, 2000, p. 83-94.
Chen, et al., "Integrating Complete-System and User-level Performance/Power Simulators: The SimWattch Approach", IEEE Micro, Jul. 2007, pp. 1-20.
Floyd, et al., "Introducing the Adaptive Energy Management Features of the Power7 Chip", IEEE Computer Society, Mar./Apr. 2011, pp. 2-16.
Hong, et al., "An Integrated GPU Power and Performance Model", Proceedings of the International Symposium on Computer Architecture, p. 280-289,, Jun. 2010, 10 pages.
Isci, et al., "An Analysis of Efficient Multi-Core Global Power Management Policies: Maximizing Performance for a Given Power Budget", Microarchitecture, 2006. MICRO-39. 39th Annual IEEE/ACM International Symposium, Dec. 2006, 12 pages.
Jacobson, et al., "Abstraction and micro-architecture scaling in early-stage power modeling.", In Proceedings of the IEEE 17th International Symposium on High Performance Computer Architecture, 2011, pp. 394-405.
Lebreton, et al., "Power modeling in SystemC at transaction level, application to a DVFS architecture", In Proceedings of the IEEE Computer Society Annual Symposium on VLSI, 2008, 1 page.
Meng, et al., "Multi-Optimization Power Management for Chip Multiprocessors", PACT'08, Oct. 25-29, 2008, 10 pages.
Ruiz, et al., "A Direct Load Control Model for Virtual Power Plant Management", IEEE Transactions on Power Systems, vol. 24, No. 2, May 2009, pp. 959-966.
Song, et al., "Instruction-Based Energy Estimation Methodology for Asymmetric Manycore Processor Simulations", In Proceedings of the 5th International ICST Conference on Simulation Tools and Techniques (SIMUTOOLS '12), 2012, p. 166-171.
Xu, et al., "A Very Fast and Quasi-accurate Power-State-Based System-Level Power Modeling Methodology", Architecture of Computing Systems ARCS 2012, Lecture Notes in Computer Science. Springer Berlin / Heidelberg., 2012, pp. 37-49.

* cited by examiner

VIRTUAL POWER MANAGEMENT MULTIPROCESSOR SYSTEM SIMULATION

RELATED APPLICATIONS

This application is a Continuation of, and claims the priority benefit of, U.S. application Ser. No. 14/040,620 filed Sep. 28, 2013.

BACKGROUND

Embodiments of the inventive subject matter generally relate to the field of computers, and, more particularly, to system design.

Energy is a major contributor to the total cost of ownership for servers, and through the lifetime of equipment, often grows larger than the initial cost of the server itself. In addition to performance and system cost, energy efficiency is one of the key considerations for server purchasing decisions. In response, computer manufacturers target lower power and better performance per watt, even in high-end servers that traditionally have been designed primarily for peak performance and reliability.

In many high-end servers, energy management firmware monitors and collects system sensors and sends out control commands to maintain the system running according to a desired energy management policy. Modeling and analysis of firmware algorithms are employed to optimize energy management to optimize performance and power.

SUMMARY

Embodiments of the inventive subject matter include generating utilization data and performance data for a simulated multi-core system with a workload model that models one or more types of workloads based on parameters that characterize the one or more types of workloads. Thermal data and power consumption data for the simulated multi-core system are generated with a power model that models power consumption at a chip-level and a system-level. Performance counter information for the simulated multi-core system is generated with a performance model that models change of performance counters over time and at least one of the generated utilization data and the generated performance data as input to the performance model. The thermal data, the performance data, the counter information, the utilization data, and the power consumption data are provided as input into an executing instance of program code that generates power management simulation events based, at least in part, on the thermal data, the performance data, the counter information, the utilization data, and the power consumption data.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
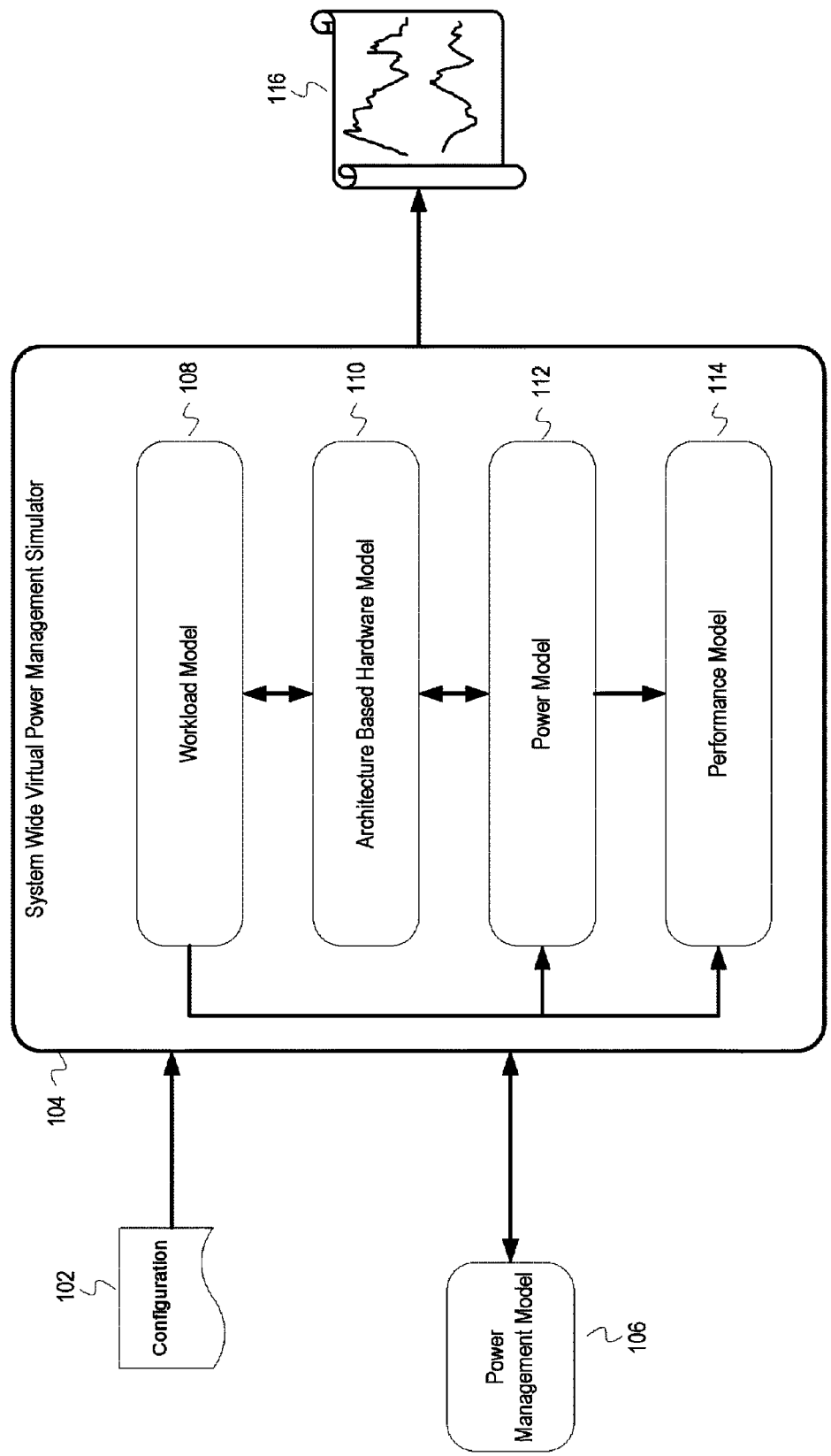
FIG. 1 depicts a conceptual diagram of an example system wide virtual power management simulator driven by a power management model.

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

INTRODUCTION

Performing system-level design and validation functions in parallel with processor development and manufacture allows for satisfaction of tight schedules for commercial server products from initial concept to final delivery to customers. Multi-core systems provide a collection of dynamic energy management features such as frequency and voltage scaling (DVFS), idle states, power gating, variable fan speed, memory low-power modes, memory throttling, and others. While this rich set of features allows for dynamic energy management, the collection of features also increases the complexity of simulating and evaluating system designs. Complex interactions between multiple features and hardware components call for extensive validation and early testing (e.g., pre-silicon testing) due to short development cycles.

Although the timescales of power and energy management sensing, control, and actuation range from microseconds to seconds, as shown in Table 1, energy management validation requires simulation over macroscopic time intervals measured in seconds, minutes, or even hours. These macroscopic time intervals conflict with the demands of a short development cycle.

TABLE 1

| Power Management Time Scales | |
| --- | --- |
| Capability | Timescale |
| Frequency slewing | 10-50 μs |
| Voltage Slewing | 100 μs-1+ ms |
| Control communications | 250 μs |
| Hardware sleep exit | 1 ms |
| Hardware sleep entry | 1+ ms |
| Control loop periods | 1-32 ms |
| OS processor folding | 1+ s |

Although it would be desirable to evaluate real power management firmware running on real system hardware during actual workload execution, circular dependencies during design concept phases require that key power management features be evaluated prior to hardware and firmware implementation. Simulation and evaluation techniques can be performed pre-silicon with circuit-level or instruction-level power models. But these models are resource intensive and cannot satisfy the tight constraints of short development cycles given the macroscopic time intervals for energy management validation.

Instead of circuit-level or instruction-level power models, a simulation system can be designed that employs high level workload and power models that satisfy the demands of short development cycles (e.g., simulating an hour of elapsed time within a few minutes) while effectively implementing system-wide simulation. This simulation system, referred to herein as a virtual power management (VPM) simulation system, can use the different models independently for algorithmic and architectural exploration for experimentation. The VPM simulation system can use the models to simulate large commercial multi-core server systems with power consumptions measured in Kilowatts, significant fixed power overheads, and significant component variability. The VPM simulation system eschews the nuances of low-level circuit- or instruction-level power models of processors because the nuances are swamped by bulk power effects at the system level. Relevant attributes such as performance, power, utilization, and temperature vary in the presence of major power management features available in commercial servers, including dynamic voltage and frequency scaling, sleep modes, and autonomous control using Critical Path Monitors (CPM), and per-thread and per-core idle mode changes. The net result is that microtimescale and micro-architectural models of power and performance are not required for system-level architectural studies or power management firmware validation. For example, if a DVFS algorithm is sampling processor performance and utilization metrics every 32 ms, then it is sufficient to model aggregate power and performance for typical hardware and workloads on the order of 32 ms. These models can be efficiently developed and execute quickly, even for large-scale system configurations.

The VPM simulation system allows for parallel development of energy policies prior to availability of detailed models of processors and systems. The VPM simulation system provides a framework that allows early evaluations to start with abstract models that can be replaced with detailed models, as the design cycle progresses. The VPM simulation can start with abstract models of power and energy management that, for example, model behavior of firmware directives such as DVFS algorithms. Use of the abstract models of power and energy management allow for faster simulations, which facilitates experimenting with power management policies prior to firmware availability. Results of experimenting may influence firmware and processor design. As more architectural details become available later in the design stages, the abstract models of power and energy management can be replaced with a full system simulator. When the VPM simulation system is used in conjunction with a full system simulator (e.g., Simics), production firmware can be emulated and debugged in parallel with processor design and system bring up.

Example Illustrations of a VPM System Simulator

FIG. 1 depicts a conceptual diagram of an example system wide virtual power management simulator driven by a power management model. A system wide virtual power management simulator includes several parameterized models. The parameterized models depicted in FIG. 1 include a workload model 108, an architecture based hardware model 110, a power model 112, and a performance model 114. Each model is at least defined by a parameter (e.g., idle power consumption of a system component in the power model 112). Some models are further defined by equations and functionality to generate data based on the equations and a parameter(s) that defines the model and/or an input into the model. The models abstract behavior of individual components to a system level for the various system factors (i.e., workload, performance, power, etc.) that influence and/or impact power management. FIG. 1 also depicts configuration data 102 being input into the system wide VPM simulator 104. The configuration data 102 can configure a parameter of any one of the models. Further, the VPM simulator 104 can be configured by executing code (e.g., an executing script) that changes parameters over time, for example.

The power management model 106 provides an abstraction of system components (e.g., firmware) that perform power management actions. Instead of simulating actual firmware, for instance, the power management model can generate various indications of power management actions, or control data. For example, the power management model 106 can output a voltage and frequency based on a dynamic voltage and frequency scaling algorithm. The power management model 106 can also indicate control data in accordance with one or more policies defined in the model. A policy can require maximum performance for a system, nominal performance to gain power savings, etc. The power management model 106 also accepts data from the system wide VPM simulator 104 as input for determining control data. For example, thermal data and performance data from the system wide VPM simulator 104 can influence the next power management action indicated by control data output by the power management model 106. The data from the system wide VPM simulator 104 can range from data from one of the models to data from all of the models. The power management model 106 can request data that is generated by a particular model. For example, the power management model 106 can request performance counter data, which is provided by the performance model 114.

The example system wide VPM simulator 104 of FIG. 1 depicts interactions among the models. The workload model 108 outputs data to the power model 112 and the performance model 114. The power model 112 outputs data to the performance model 114. Data flows in both directions between the workload model 108 and the architecture based hardware model 110. Data also flows in both directions between the architecture based hardware model 110 and the power model 112.

Workload Model

The workload model 108 models random scheduling effects on a number of active threads, performance variation with frequency, memory rate per instruction, changes in instructions per cycle (IPC) by thread depending upon a number of active threads. When no threads are active, a core can idle or enter a power savings mode. A high-level scheduler controls the workload run.

As control algorithms of the power management model 106 read sensor data from the system wide VPM simulator 104 and manipulate actuators by sending control data into the simulator 104, the workload model 108 approximates a stream of software executing on processor cores. The workload model 108 describes a specific workload's characteristics, such as throughput rate, memory bandwidth, and power consumption relative to a baseline. The workload model 108 generates performance data and utilization data, passes that data to the power model 112 and the performance model 114. Examples of the performance data include instructions per cycle. Utilization data can indicate utilization of a thread and/or a core.

The workload model 108 also includes an interface to the power model 112 and the performance model 114. The interface allows arbitrary workloads to be easily fed into the VPM simulator 104 via an external text file or an internal pattern generator, for example. For example, throughput rate, memory bandwidth and power consumption can be defined arbitrarily without any actual workload. These workload characteristics can be written to a file that is input into the VPM system simulator 104, entered via a user interface of the VPM system simulator 104, generated by a program that randomly generates workload characteristics that comply with pre-defined constraints on those characteristics, etc. Example types of workloads include a directed repeating sequence, and a model of an energy-efficiency benchmark.

The directed repeating sequence type of workload model, also referred to herein as an IPC model, characterizes a workload by the instructions per cycle, or IPC. For compute-intensive workloads, IPC may vary only slightly with changes in processor frequency, which makes this a good base characterization metric in a frequency-scalable system. One implementation of a directed repeating sequence type of workload interprets a list whose elements describe a workload that moves through phases on a fixed, repeating schedule. This implementation is referred to herein as an IPC Levels workload model. With the IPC Levels workload model, each workload phase is characterized by several parameters including the phase duration, IPC, single-threaded utilization, average memory access rate per instruction, and the Active Power Factor (APF) of the workload. The APF of the workload describes the power of the current phase as a percentage of a baseline power value. The baseline power is the nominal power of a processor core when running a reference workload such as the one used for thermal design point (TDP) characterization, at a known frequency, voltage and temperature. Thus the APF represents the expected relative power when running the workload being modeled. For system level simulation, separate, potentially different, repeating workload sequences or streams execute on each modeled core.

The IPC Levels workload model can be used to study a system response to workloads with utilization spikes, for example, or observe how well power-management algorithms behave in the event of pathological workloads. Throughput response to frequency variation in this type of workload model is provided in two ways. First, since the number of cycles per second varies with frequency, the instruction execution rate (IPS) naturally varies with frequency if IPC input is constant. Parameters also allow IPC to be scaled exponentially as expressed by equation 1 and a scalable parameter K, where $0 \leq |K| < 1$:

$$IPC_{current} = IPC_{nominal} * \left(\frac{F_{nominal}}{F_{current}}\right)^K. \quad \text{(Equation 1)}$$

In addition to Equation 1, a workload model can be defined with either or both of core utilization and thread utilization. Thread utilization can be computed with Equations 2 and core utilization can be computed with Equation 3:

$$U_{thread} = U_{nominal} * \left(\frac{F_{nominal}}{F_{current}}\right); \quad \text{(Equation 2)}$$

$$U_{core} = 1 - (1 - U_{thread})^N. \quad \text{(Equation 3)}$$

An IPC Levels type of workload model can model single-threaded utilization as scaling linearly with the inverse of frequency as expressed in Equation 2. The workload model 108 implementing an IPC Levels type of workload model can clip $U_{thread}$ to conform to the range [0 . . . 1]. This range corresponds to 0% to 100% utilization. Equation 3 presumes N identical threads and approximates core-level utilization $U_{core}$ by a statistical model based on independent threads.

A workload model can be defined to characterize a workload in accordance with various available modes that impact power management, such as low power modes (e.g., sleep). For example, a workload model can be defined that places each thread in a core-clock-gated low power state during unutilized periods, with optional frequency reduction. A workload model can also be defined to explicitly insert periods corresponding to one of the low power modes described in Table 2 as workload phases.

TABLE 2

Core states in different low power modes

| Mode | Description |
|------|-------------|
| 1 | Core clocks stopped; L2/L3 caches run at optionally reduced frequency |
| 2 | Core and caches quiesced and held at a non-operational voltage |
| 3 | Core and caches quiesced and power-gated |

The second example type of workload, the energy-efficiency benchmark model (e.g., SPECpower_ssj2208 benchmark), individually schedules work for each thread. The energy-efficiency workload statistically models the arrival of work requests or transactions for each thread to produce a target aggregate utilization. As each work request arrives at a thread it is transformed into a fixed number of instructions to execute. The execution rate of a thread varies with frequency as well as the number of other concurrent active threads, thus capturing the variability in the per-thread IPC as threads become active, complete their work, and then drop into idle states. Table 3 indicates example simulated changes in per-thread IPC as the number of active threads varies for one system configuration.

TABLE 3

Per-thread IPC for one system configuration, normalized to single-threaded IPC

| | Active Threads | | | |
|---|---|---|---|---|
| | 1 | 2 | 3 | 4 |
| $IPC_{thread}$ | 1.00 | 0.75 | 0.62 | 0.50 |
| $IPC_{core}$ | 1.00 | 1.49 | 1.87 | 2.00 |

Having a thread-based energy-efficiency workload model realistically captures the randomness in thread and core utilization for fully characterizing DVFS algorithms.

The energy-efficiency workload model advances in discrete phases, where phase boundaries correspond to changes in the number of active threads, and the length of each phase is determined by the processor frequency and the IPC model for the given number of active threads. Instruction completion, utilization and memory bandwidth counters as well as per-core energy accumulators are updated at each phase, based on the characteristics and final elapsed time of the phase.

If all threads in a core are idle, then model configuration settings determine the idle state entered, and whether autonomous power management actions occur. Examples of autonomous power management actions include the automatic reduction of processor frequency for a low power mode 1, the automatic reduction of chip voltage for low power mode 2, and core-level power-gated idle modes. Idle intervals are observable to firmware as 0% utilization intervals, and the core power models account for the reduced power levels. The energy-efficiency modeling environment also includes the ability to model idle-core folding algorithms implemented by an operating system and a hypervisor. The power management model 108 models this by monitoring the utilizations of cores and when they are below a threshold, placing a number of cores in an idle state and spreading the thread level activity on the vacated cores to the remaining active cores.

The system wide VPM simulator 104 is not limited to simulating a system with only a single type of workload model. The VPM simulator can simulate a system with mixed workloads. The workload model 108 can specify a different workload on each core or sets of cores to create the mixed workload simulation. For example, a subset of cores could be set to run the 100% load level of the energy efficiency workload, whereas other subsets could be specified to run another load level or even the IPC Levels workload model. It is also possible to construct variations of the load level sequence. For example, instead of a sequence that goes from the 100% load level down to 0% utilization in steps of 10%, a workload can be derived to go through a different load level sequence. The duration of each load level can also be changed.

Power Model

The power model 112 is an aggregate of chip-level and system level models that include a processor model, a memory subsystem model, a system background power model, and power regulation and distribution losses. Embodiments are not limited to modeling these particular chip-level components. But efficiency is preserved by limiting modeling to components above the microarchitecture level. The power model 112 generates power consumption data and thermal data. The power model 112 generates the power consumption data based on chip-level and system-level estimates or previously taken measurements of power consumption. The power model 112 generates the thermal data based on a thermal model.

The chip-level model encompasses the cores, caches, busses, on-chip memory controllers, accelerators, I/O engines, and I/O drivers within each processor chip of a simulated system. Core power is nonlinear in voltage, and linear in both frequency and the workload activity power factor (APF). The power model 112 is parameterized with core leakage and active power at a reference voltage and reference frequency, and is used to estimate core power at other frequency and voltage points using the power curve fit as expressed in Equation 4, where L is a leakage coefficient and A is an active-power coefficient defined in the power model:

$$\text{Core power}|_{V,F} = \text{leakage\_power}\Big|_{V_{ref}} * \left(\frac{V}{V_{ref}}\right)^L + \text{active\_power}\Big|_{V_{ref},F_{ref}} * \left(\frac{V}{V_{ref}}\right)^A * \left(\frac{F}{F_{ref}}\right) * APF, \quad \text{(Equation 4)}.$$

Equation 5 expresses how to compute the workload APF:

$$APF = \frac{\text{core power}|_{V_{ref},F_{ref}} \text{ for target workload}}{\text{core power}|_{V_{ref},F_{ref}} \text{ for reference workload}}, \quad \text{(Equation 5)}.$$

The coefficients L and A are typically available from circuit designers early in the design phase of a new processor. The values for computing APF are estimates based on measurements of a similar processor or power simulation, usually provided by a design team. In addition to being reactive to voltage and frequency, core power can be formulated to be invariant to or responsive to the number of active threads. Core leakage power is also affected by temperature. The thermal model, which is described later, can be used to estimate core temperatures under given workload and ambient temperature conditions.

The power for private caches can be combined into the power model of their cores, or separately estimated. If separately estimated, the power equation will be similar to Equation 4. Cache power can be modeled separately to evaluate cases where the caches may be operational even when the cores are power-gated. In addition to power of the cores, processor chip power consists of power for the busses, on-chip memory controllers, accelerators, I/O engines, and I/O drivers. These are estimated separately and added to the core power estimate to obtain the total processor power.

The power model also includes models of power consumption by a memory subsystem and storage components. The memory subsystem power approximates power for DIMMs and if present, memory buffer chips. DIMM power and memory buffer power can be modeled by a linear equation (Equation 6), where idle power is the DIMM or memory buffer power at idle, BW is bandwidth, and $P_{BW}$ is power per unit bandwidth consumed:

$$\text{memory component power}=(P_{BW}*BW)+\text{idle\_power}, \quad \text{(Equation 6)}.$$

These parameters idle_power, BW, and $P_{BW}$ are defined based on the system being simulated. Storage components can include hard disks and optical drives. Idle power for each drive can be measured or obtained from data sheets; for spinning-type drives, idle disk power is typically between 6 W and 10 W. When the drive is being actively used, disk power depends on the amount of activity caused by the workload on the system, and can be estimated with a linear equation similar to Equation 6.

The power model 112 may also include a fan model that approximates power consumption to account for variable speed fans. Thermal and firmware engineers set the minimum fan revolutions per minute (RPM) and the RPM response to sensors for ambient temperature, pressure and altitude, and temperature sensors embedded inside chips and throughout the system. The relationship between fan RPM and power can be obtained from data sheets or measurements on existing systems.

The power model 112 can also include a system background power model. The system background power model encompasses contributors that are not included in the other primary models. Examples of these contributors include I/O controllers, I/O adapters, media backplanes, and storage controllers.

The power model 112 can also include a model of power regulation and distribution losses for a system. Processors, DIMMs and memory buffers have voltage regulators that supply the specified voltages to these components, and expend a significant amount of power as a side effect. The regulator power loss can be estimated using the regulators' efficiency rating, $VR_E$. Resistive power loss on the power distribution network can be approximated by an efficiency factor, $VR_D$. Processor power including regulator and distribution losses can be computed as:

$$P_{processor} = P_{within\ package} * \frac{1}{VR_E} * \frac{1}{VR_D}, \quad \text{(Equation 7).}$$

Voltage regulator and distribution efficiency factors are well known to the power sub-system designers. Total DIMM power and memory buffer power can be estimated similarly from the design parameters for their power rails. In systems that have AC-to-DC power supplies, the conversion loss in the power supply should also be taken into account. Power supply conversion efficiency depends on the rating of the power supply and the power drawn by the system. Conversion efficiency can be obtained from power supply vendors or measurements.

Performance Model

The performance model 114 updates performance counters (i.e., values that represent of performance counters) over time, in response to workload changes and power management actions, including DVFS and core power state/mode changes. The performance model 114 models dedicated registers accessed by firmware including raw cycles, run cycles, dispatched instructions, and completed instructions. The run cycles counter counts the number of non-idle cycles as determined by a register facility controlled by an operating system and hypervisor. This counter is used a part of the computation of core-level utilization for DFVS algorithms, and provided to a driver of a simulation (e.g., power management model).

The performance model 114 models performance counters based on utilization data (e.g., core utilization) determined by the workload model 108 as described above. For example, performance model 114 models performance counters for an IPC type of workload model as indicated below:

$$\text{run cycles} = U_{core} * t * F_{current}, \quad \text{(Equation 8);}$$

$$\text{raw cycles} = \text{run cycles} + ((1-U_{core}) * t * F_{idle}), \quad \text{(Equation 9); and}$$

$$\text{instructions completed} = IPC * \text{run\_cycles}, \quad \text{(Equation 10).}$$

In the above equations for performance counter modeling, t is the sampling interval duration, $F_{current}$ is the current frequency, and $F_{Idle}$ is the core frequency selected automatically by hardware in an idle state. For the energy-efficiency workload model, the performance model can be embedded inside the workload model itself. The performance model tracks the performance counters as the workload simulation progresses. For example, when a core enters low power mode 2 of Table 2, the performance model stops incrementing the run cycles counter, whereas the performance model continues to increment the raw cycles counter at the current core frequency. Workload model parameters such as IPC, application throughput metrics, memory bandwidth consumed and duration of each workload phase can be obtained from measurements or projections for future systems obtained from more detailed performance models.

Thermal Model

As mentioned earlier, the power model 112 includes or interacts with a thermal model. The thermal model models the effect of workloads on key thermal sensors in a simulated system. For instance, temperature models can model processor core, DRAM, memory buffer, and on-chip I/O interconnect temperatures. These thermal models are used to test the thermal management functionality in firmware under development. To that end, the goal is not to model the temperatures accurately, but to show realistic temperature trends in critical components when a workload is executing.

The VPM simulator 104 can also inject extreme temperature values into specific modeled sensors to test thermal management firmware. As an example of a thermal model, the processor cores use a linear model:

$$T_{core\_target}(t) = (P_{core}(t) - P_{core\_base}) * TSF_{core} + T_{core\_base}, \quad \text{(Equation 11).}$$

In equation 11, $T_{core\_target}(t)$ is the target core temperature at time t. $P_{core}(t)$ is the processor core power computed by Equation 4 at time t. $P_{core\_base}$ is the base core power that is defined as the core power at idle. $T_{core\_base}$ is the base temperature at idle. $TSF_{core}$ is the core temperature scale factor that determines the magnitude of core temperature change for the difference in the current core power compared to the base core power. In reality, the target temperature is not reached instantly. For example, when core power increases, core temperature rises gradually at a rate that depends on factors such as the ambient temperature. To model this effect, the core temperature change is modeled as follows:

$$T_{core\_diff}(t) = T_{core_{target}}(t) - T_{core}(t), \quad \text{(Equation 12); and}$$

$$T_{core}(t) = T_{core}(t) + \delta t * T_{slope} * T_{slope\_factor}(T_{core_{diff}}(t), T_{amb}), \quad \text{(Equation 13).}$$

$T_{core}(t)$ is the core temperature at time t. $\delta t$ is the time since the last evaluation of the thermal model. $T_{slope}$ is a temperature slope that determines how rapidly the temperature changes. $T_{slope\_factor}$ is a modifier to $T_{slope}$ that sets the direction of temperature movement and provides a means to increase the rate of temperature increase or decrease the rate of temperature decrease beyond an ambient temperature threshold. $T_{amb}$ is the current ambient temperature. Embodiments can include thermal models for other components such as memory buffers and DRAM, which would be similar to the processor thermal models.

Architecture Based Hardware Model

The architecture based hardware model 110 models power management structures (e.g., microcontrollers, state machines, circuits, etc.) embedded inside cores or chips in some systems. The hardware model 110 interprets counter addresses used by firmware to identify the addressed power management registers. The power management model 106 provides the counter addresses to the VPM simulator 104. During early phases of the chip design, the counter addresses may not be known. In such cases, the power management model 106 can access the power model and performance model through high-level APIs implemented in the hardware model 110, instead of counter addresses. The hardware model 110 also models register states of registers used for power management and simulated behavior of operations on these registers, as well as frequency and voltage slew times. The hardware model 110 communicates the register states back to the power management model 106 as well as any simulated behavior of operations (e.g., a power management action) on the registers. If the hardware model 110 generates a power management action, that action is indicated to the power model 112. The hardware model 110 can also model autonomous power management decisions, such as modeling hardware autonomously reducing frequency if core activity drops below a programmable threshold. If the hardware model 110 generates an autonomous power management decision, the decision is fed into the power model and the performance model since the decision will affect calculations done in the power and performance models.

Output of Simulator

With each system wide evaluation, the simulator 104 outputs performance data 116 that facilitates exploring improvements to power management architecture and dynamic power management algorithms. A VPM system simulator can output the performance data 116 as a fine based graphical display of performance and power metrics as they evolve in response to a workload simulation, as well as a detailed text log of simulation results. The output performance data 116 could be plots that show a graduated reduction in activity level variation in total system power, and also power of components such as processors, memory, and fan, along with the temperatures predicted by the thermal model. Performance metrics such as instructions per second and memory access rate may also be shown, time aligned with the power plots. Embodiments can also display plots of sensors related to the power management firmware. These include actual chip utilizations, utilizations as perceived by the power management algorithm in each control window, and the voltage/frequency selections made by the algorithm. In addition, a graphical user interface can show the number of active cores in each chip for a simulation, which is useful to monitor core folding.

Although FIG. 1 depicts the VPM simulator running in conjunction with a power management model, embodiments are not so limited. A VPM simulator can run in conjunction with a full system simulator (e.g., Simics). A VPM simulator can first run in conjunction with an abstraction of power management firmware to aid in design of a system. After establishing sufficient system design details based on the simulations, the VPM simulator can then run in conjunction with a full system simulator.

Figure 2:
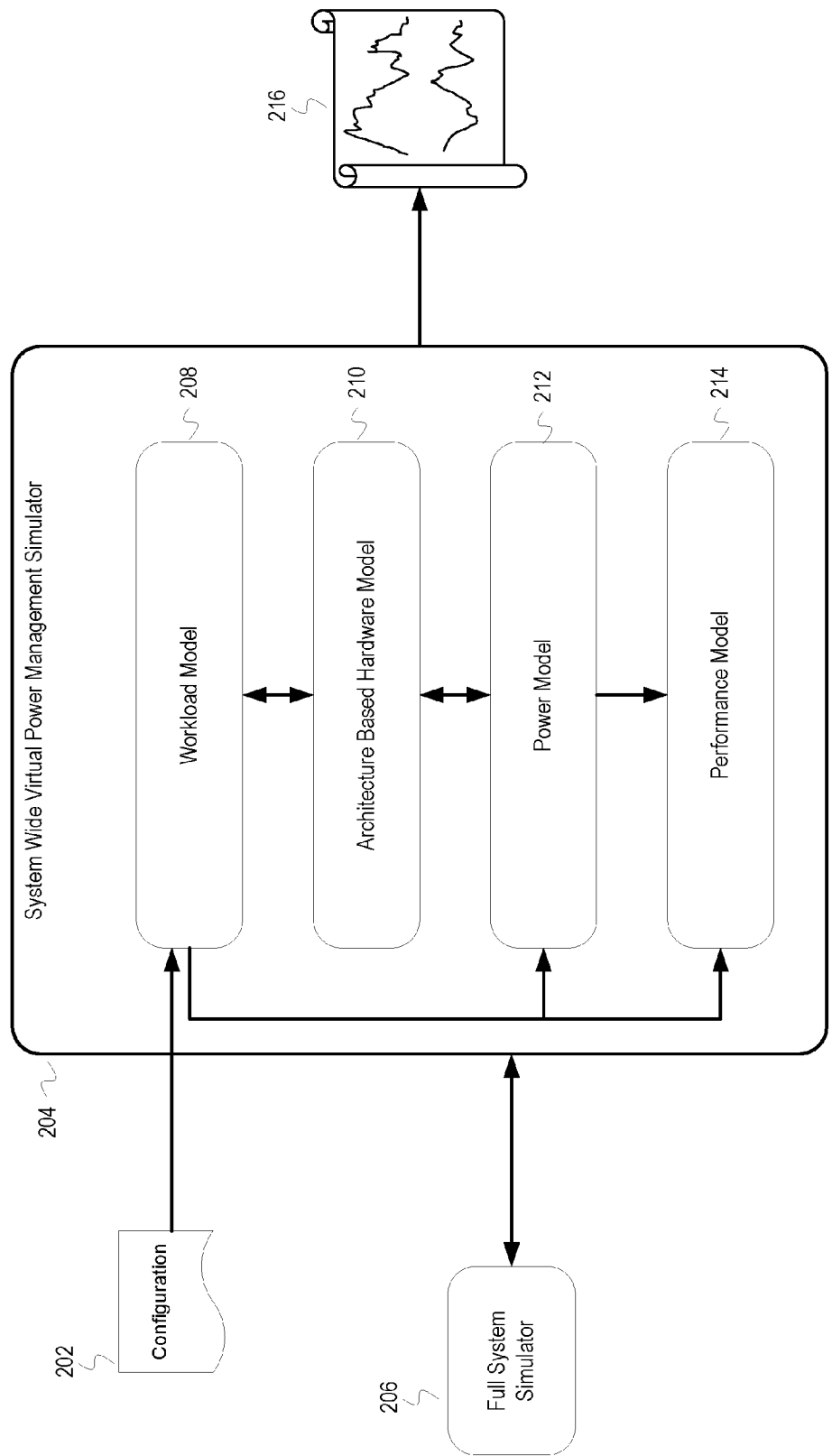
FIG. 2 depicts a conceptual diagram of an example system wide virtual power management simulator driven by a full system simulator.

FIG. 2 depicts a conceptual diagram of an example system wide virtual power management simulator driven by a full system simulator. The system wide VPM simulator 204 includes several parameterized models, as in FIG. 1. The parameterized models depicted in FIG. 2 include a workload model 208, an architecture based hardware model 210, a power model 212, and a performance model 214. FIG. 2 also depicts configuration data 202 being input into the system wide VPM simulator 204. The configuration data 202 can configure a parameter of any one of the models. Further, the VPM simulator 204 can be configured by executing code (e.g., an executing script) that changes parameters over time, for example. In FIG. 2, the VPM simulator 204 is depicted as running in conjunction with a full system simulator 206. The full system simulator 206 executes actual firmware to determine power management actions instead of modeling firmware. The full system simulator 206 accepts input from the VPM simulator 204, which influence the power management actions of the executing firmware in the full system simulator.

Example Operational Illustrations

Figure 3:
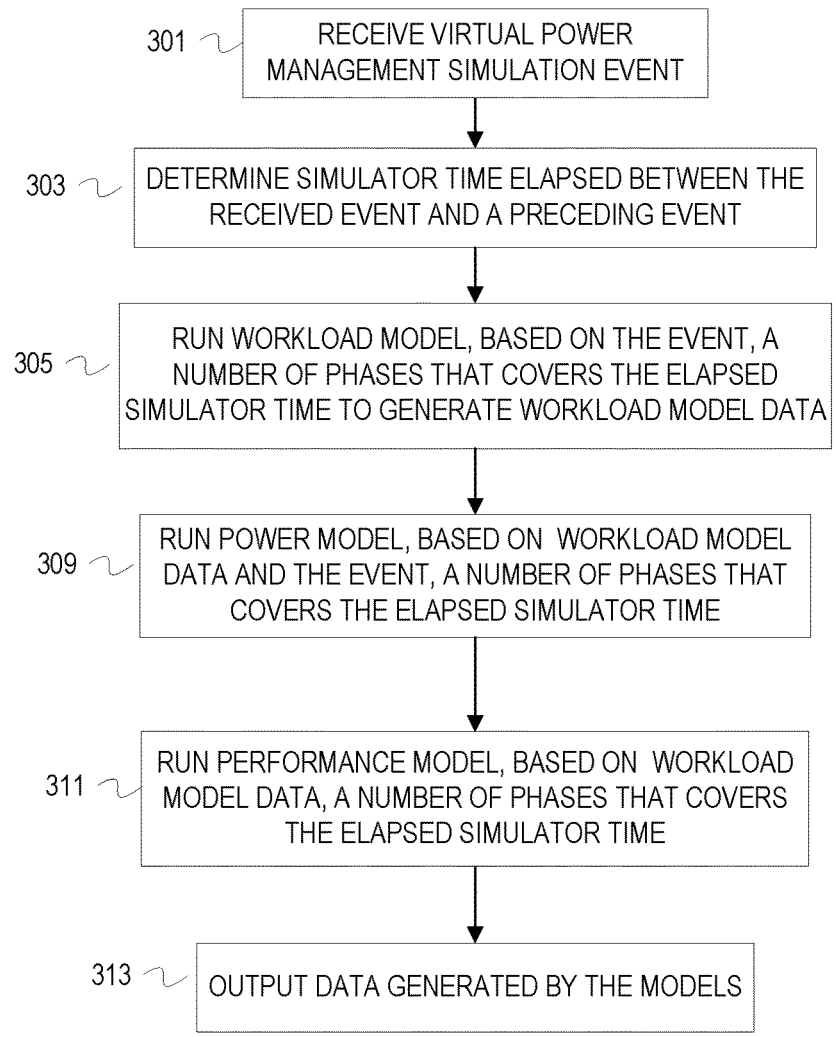
FIG. 3 depicts a flowchart of example operations for a model-based power management driven system simulator.
Figure 4:
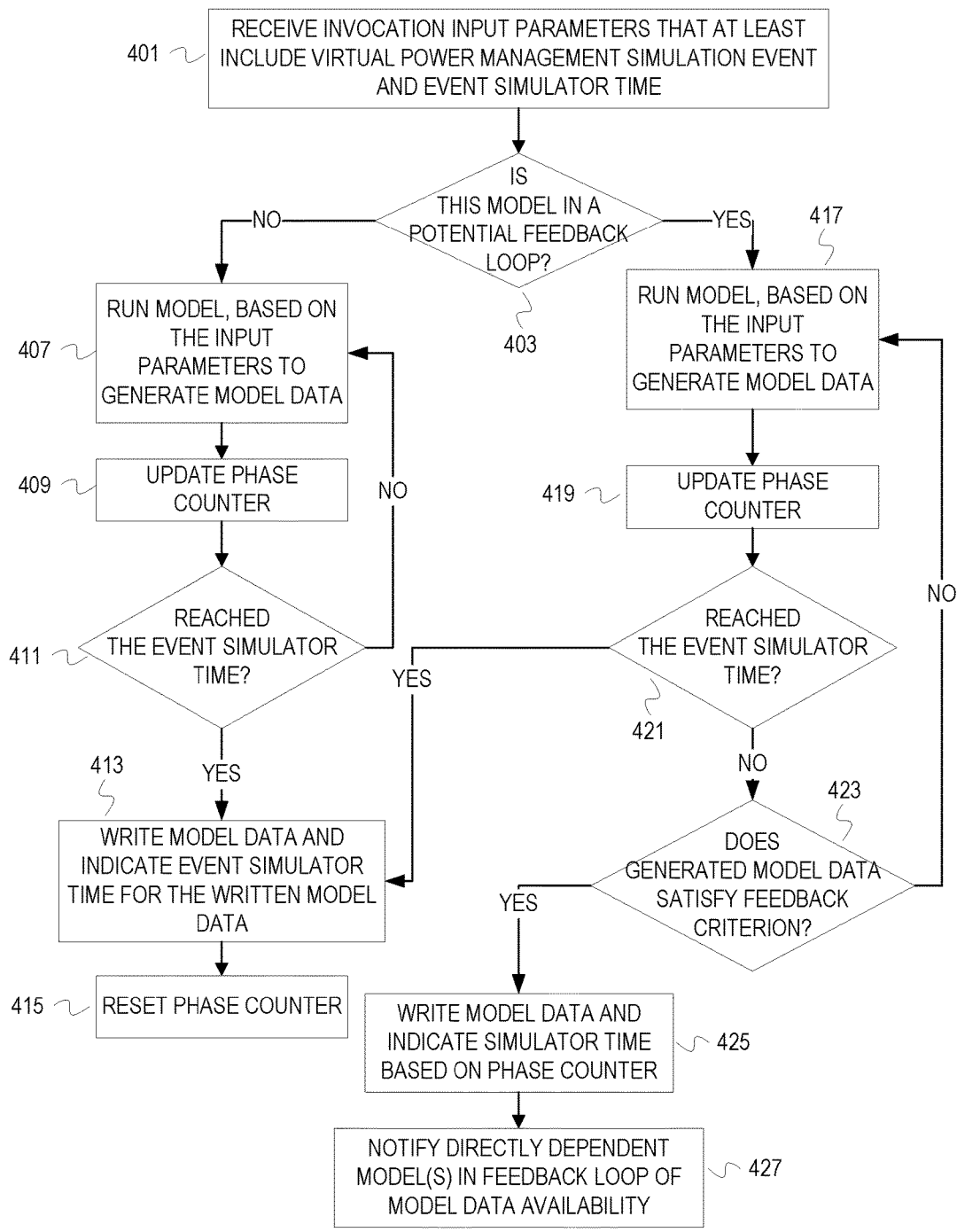
FIG. 4 depicts a flowchart of example operations for a model of a model-based virtual power management driven system simulator.

A simulator that models aggregate behavior of chip-level and system-level components based on virtual power management with the various models described above is initialized with the model parameters. The workload model, for instance, is initialized with the parameters that characterize the type(s) of workload to be simulated. In addition, the models are configured in accordance with a system to be simulated. For example, a full system simulator communicates a system configuration (e.g., number of processors and cores on each processor) to the simulator. The simulator then configures the models accordingly. A driver of the simulator and the simulator also establish means by which the driver will supply information and obtain information. After initialization, the model based power management driven system simulator can run evaluations periodically, or run evaluations responsive to requests from a simulation driver (i.e., demand driven approach). The operation of a model based power management driven system simulator can vary depending upon which models are being implemented. For instance, a simulator can be implemented with the workload model, power model, and performance model, each run in turn. A simulator can have additional models that result in potential feedback loops among models. FIG. 3 depicts a flowchart that corresponds to a simulator implementation without potential feedback loops. FIG. 4 depicts an example flowchart for a possible implementation that accommodates feedback loops among models. Both provide a perspective for the demand driven approach.

FIG. 3 depicts a flowchart of example operations for a model-based power management driven system simulator. The example operations only represent operations for the primary models depicted in FIG. 1 (i.e., workload model, power model, and performance model). With additional models, additional operations would be performed. In addition, the example operations presume that a thermal model is embedded within the power model of the VPM system simulator.

At block 301, a virtual power management simulation event is received. The virtual power management simulation event may be a request to read a power management related register or sensor. The virtual power management simulation event may be an indication of a power management action (e.g., low power mode for memory, DVFS action, etc.).

At block 303, simulator time elapsed between the received event and a preceding virtual power management simulation event. Each time an event is received, the simulator records the time of that received event. The simulator can maintain a history of the events and corresponding times, or maintain a last n events and corresponding times. The time may be indicated as a virtual time stamp that accompanies a data structure (e.g., message) populated with information for the event. For example, a full system simulator may use virtual time stamp based on a system time of the system being simulated by the full system simulator. In another implementation, the event indicates an amount of virtual time since the last event. In this case, the elapsed time is the time itself indicated in the event message.

At block 305, the workload model is run, based on the event, a number of phases that covers the elapsed simulator time to generate workload model data (e.g., utilization data and performance data). Running the workload model computes utilization data and performance data based on workload model parameters that characterize a workload (e.g., IPC and memory bandwidth) and the workload model equations. The simulator runs the workload model a sufficient number of times to cover the elapsed simulator time. For example, the event may be a DVFS action and the elapsed simulator time 10 milliseconds. Running a first phase of the workload model may encompass 2 milliseconds of simulator time. Running a second phase of the workload model may encompass 4 milliseconds of simulator time. The workload model would continue running the model until the entire 10 milliseconds is covered. After each phase, the workload model may overwrite the model data generated by the previous phase, record data generated at each phase, or record a last data for a last n phases.

At block 309, the power model is run, based on the event and the generated workload model data, a number of phases that covers the elapsed simulator time to generate power model data (e.g., thermal data and power consumption data). Running the power model computes the power model data based on power model parameters, the power model equations, and the workload model data. For example, the power model runs the thermal model and the various aggregate component models to compute estimates of power consumption by aggregates of system components using a frequency and voltage corresponding to the event. The simulator runs the power model a number of times until the elapsed simulator time is covered.

At block 311, the performance model is run, based on the generated workload model data, a number of phases that covers the elapsed simulator time to generate performance model data (e.g., updates modeled performance counters based on the utilization data and performance data generated by the workload model). As with the other models, the performance model is run a number of phases sufficient to cover the elapsed simulator time.

At block 317, the data generated by the models are output. This data may have been output as each model finished running all phases. Outputting the data may be writing the data to a location accessible by a process that will communicate to the simulation driver. Although not depicted, the data can also be provided to a user interface for display and manipulation.

FIG. 4 depicts a flowchart of example operations for a model of a model-based virtual power management driven system simulator. As noted earlier, these operations presume a possible feedback loop of dependencies among models.

At block 401, invocation input parameters that at least include a virtual power management simulation event and an event simulator time are received. For example, the simulator can receive an event message from a simulation driver (e.g., a power management model or a full system simulator). The simulator can parse the message and extract an indication of the event and the simulator time (e.g., an amount of virtual time or a specified virtual time). The simulator then invokes program code, for example, that implements the workload model and passes the indication of the event (e.g., a target frequency if the action is a DVFS action) and the event simulator time as parameters. The event simulator time passed to the models may be an amount of virtual simulator time that has elapsed since the last event or a time when the event occurred (e.g., a virtual simulator time when actuation was performed or when a request to read a sensor was generated).

At block 403, it is determined whether the model is in a potential feedback loop. Models of the simulator can generate data that influences the data generated by another model. If the dependency is only unidirectional, then the current model is not invoked until the model(s) upon which the current model depends have completed. However, a model can be in a feedback loop that includes multiple models. Thus, the other model(s) in the feedback loop must be run to determine whether they generate data that can impact the computations of the current model prior to the current model's data being output as final evaluation data. Configuration data of the simulator can indicate the dependencies among models in the simulator. This configuration data can be updated as models are added or removed from the simulator. If the model is in a potential feedback loop, then control flows to block 417. Otherwise, control flows to block 407.

At block 407, the model is run, based on the input parameters, to generate model data. If the model is dependent upon another model(s) but is not in a potential feedback loop, then the input parameters would include the data generated by that other model(s). The model is run for a single phase of the model. A phase of the model is defined by the model parameters.

At block 409, a phase counter is updated. A model may have different phases because it is simulating workload with changing characteristics. A model may have different phases bound by time if the phases of a model can impact other phases. For example, the power model may be defined in phases that depend upon temperature change provided by a thermal model in defined time intervals. The simulator time encompassed by a phase can vary among models and even between phases of a same model. In that case, embodiments would implement an accumulating timer ("local timer") instead of a phase counter. The timer would be updated to determine the amount of virtual simulator time that has passed for the currently run phase.

At block 411, it is determined whether the model has reached the event simulator time. In a phase counter implementation, the model computes the amount of elapsed virtual simulator time based on the phase counter to determine whether the event simulator time has been reached. In other embodiments, the model uses the local time to determine whether the event simulator time has been reached. If the event simulator time has been reached, then control flows to block 413. Otherwise, control flows back to block 407.

At block 413, the generated model data is written along with an indication of the event simulator time. In some implementations, models write model data to a location that is accessible by other models and the process or module responsible for reporting out final results to the simulation driver. When feedback loops are possible, this data may be from an intermediate phase instead of the final phase. The event simulator time is indicated with the model data to indicate that the model data is from the final phase. In some embodiments, the final phase data is written to a memory location reserved for final phase data. Thus, the event simulator time may not be indicated. In other implementations, a flag can be set to indicate that the model data corresponds to a final phase.

At block 415, the phase counter is reset.

If the model is potentially in a feedback loop as determined at block 403, then control flowed to block 417. Blocks 417, 419 and 421 are similar to blocks 407, 409, and 411. At block 417, the model is run, based on the input parameters, to generate model data. If the model is in a feedback loop, the model may receive different sets of input parameters from one or more other models in the feedback loop upon which this model depends. At block 419, the phase counter is updated. At block 421, it is determined whether the model has reached the event simulator time. At block 421, however, control flows to block 423 if the event simulator time has not yet been reached.

At block 423, it is determined whether the generated model data satisfies a feedback criterion. The feedback criterion is a criterion set to determine when model data may trigger the feedback loop. For example, the criterion may indicate that the feedback loop is triggered if a particular value generated by the model exceeds a defined threshold. For example, a criterion in the workload model indicates that core utilization falling below a given threshold may trigger a feedback loop. This may trigger a feedback loop because the low core utilization may cause the hardware model to perform a power management action. Since core utilization can vary across workload model phases, the power management action would fail to be simulated if core utilization returned above the threshold at the final phase. Although the operations indicates criterion, multiple criteria can be set. If the criterion is satisfied, then control flows to block 425. Otherwise, control flows back to block 417.

At block 425, the generated model data is written along with an indication of the simulator time based on the phase counter. Associating the model data with the indication of simulator time corresponding to the currently completed phase allows a consuming model to determine how many phases can be run. For example, the event simulator time may be 5 milliseconds. The model may generate model data that triggers a potential feedback loop after running phases that cover 2 milliseconds. A model in the potential feedback loop that consumes that generated model data runs until it covers the 2 milliseconds instead of the complete 5 milliseconds.

At block 427, the directly dependent model(s) in the potential feedback loop is notified of the model data availability. In some implementations, the notification can include the generated model data and corresponding simulator time instead of writing that data and time to a particular memory location. At this point, the current model stops working (e.g., sleeps, terminates, etc.) until it is invoked by the model(s) in the feedback loop that potentially influences the current model. The current model would resume state based on the last recorded simulator time of the last phase (e.g., phase counter).

Demand Driven Approach

The example operations depicted in FIGS. 3 and 4 are based on a demand driven approach for the VPM system simulator. In the Simics environment, virtual simulated time advances in discrete steps as the control processor model executes firmware instructions, a process highly optimized for performance. With the demand driven approach, performance and power data are computed only when triggered by a simulation instigator, such as firmware or a power management model. This reduces simulation overhead by aggregating the work of numerous events into a single interruption of the optimized processor simulation within Simics. With the demand driven approach, a VPM model evaluation begins when a value of a performance sensor is requested or a new value is written into a control register. Hooks can be written into a system simulator for selected register accesses to send control data into the VPM system simulator or to obtain sensor data from the VPM system simulator.

As indicated in the flowcharts, requests from and control inputs into the VPM models are tagged with the current virtual time. Core workload, power and performance models store an indication of the last time the model was evaluated. When firmware requests an instruction throughput counter, for example, the workload model is evaluated from the last evaluation time up to the current virtual time, then the workload model updates all of the per-core and/or per-thread performance counters based on the modeling of the interval and the final value of the counter is returned. The core power and energy models are also updated at this time. Actuation actions may also trigger workload evaluation. For example when a core frequency changes, the workload and power models are first brought up to date to the current virtual time. Evaluation in subsequent intervals will now take place with the new frequency, which will influence the rate of performance counter accumulation predicted by the models.

Although the example operations are based on a demand driven approach, embodiments are not so limited. Embodiments can periodically or continuously run evaluations and provide results to the simulation driver. In turn, the simulation driver can react with control information or information requests. Furthermore, the operations depicted in the flowcharts are examples and embodiments can perform different operations, operations in a different order (e.g., in parallel), etc. For instance, operations for a model can be different for FIG. 4 with an implementation that uses a managing process to direct models. The managing process can be aware of dependencies among models and run models accordingly. The managing process could monitor data written by the models and pause models when data triggering a potential feedback loop is detected. In another implementation, models can run until the data generated by a phase changes from a preceding phase. A model can then notify a dependent model in the potential feedback loop. In another implementation, models could run to encompass an entire elapsed simulation time and record each change in model data along with the corresponding simulator time. Models in potential feedback loops can then evaluate the history of data and determine whether a feedback loop would be triggered. If a feedback would be triggered, then a consuming model can incorporate that impactful data and rerun from the corresponding simulator time of the impactful data. In yet another implementation, models in potential feedback loops could be run in a synchronized manner. These models could run lock-step with each other and read data from the other before continuing.

Further, the flowcharts refer to running models and the description sometimes to refer to evaluations. When the description refers to "running" or evaluating a model, that terminology encompasses invoking, executing, or interpreting program code/instructions that read the appropriate data for a model (i.e., input parameters and/or model parameters) and compute values in accordance with the model equations. Running a model in this description, however, typically refers to a single phase. In other words, running a model typically refers to running the program code/instructions to generate an instance of model data. An evaluation in the context of the demand driven approach, refers to running a model through multiple phases which results in generating model data multiple times. Each instance of model data may not be maintained.

Additional Architecture Based Models

A VPM system simulator can include additional models depending upon the architecture of the system being simulated. While the addition of these models can increase complexity of the VPM system simulator, the additional models can also increase accuracy of the system simulation. As with the above, the additional models each model power relevant behavior of an aggregate of system components to preserve efficiency of the VPM system simulator. Examples of the additional models include an on-chip voltage regulator mode, a load line power model, and a critical path monitor model.

To evaluate systems with on-chip voltage regulators, a VPM system simulator models the enabling and disabling of these regulators according to their design. Typically, linear regulators will be bypassed if the difference between the external regulator voltage and the desired core voltage is less than a threshold. When linear voltage regulators are active, the power model of the VPM system simulator estimates the power loss, $P_{loss\text{-}iVR}$ at these regulators due to one core as:

$$I_{core} = \frac{P_{core}}{V_{iVR}}, \text{ and} \qquad \text{(Equation 14);}$$

$$P_{loss\text{-}iVR} = I_{core} * (V_{in} - V_{iVR}), \qquad \text{(Equation 15).}$$

$I_{core}$ is the current drawn by a core, and $V_{iVR}$ is the voltage at the output of the internal linear voltage regulator supplying the core. $V_{in}$ is the voltage at the input to the processor. The summation of $P_{loss\text{-}iVR}$ over all cores gives the total loss due to on-chip voltage regulators for all cores.

A load line describes the response of a power supply to variable current demands by decreasing the output voltage as current demands increase. Providing higher voltages at lower currents protects the system against load spikes, at the cost of energy inefficiency for lower current loads. Since the load line models an IR voltage drop, a load line power model combines the power supply load line effect with the actual resistive losses in power distribution.

Typically, firmware sets the voltage at an external voltage regulator at a value that is adequate for the desired frequency, F under worst case workloads and environmental conditions (high current draw). The voltage seen at the processor circuits will be lower because of the voltage drop across the load line. If the simulated workload running on the processor is light or the chip temperature is below worst case, then the processor draws less current. Consequently, the voltage at the processor circuit will be higher than for a heavy workload. Workload and environmental voltage variation at the chip due to the load line is measured in tens of millivolts for high-performance server processors, i.e., a significant percentage of the typical approximately 1 Volt operating voltage, therefore modeling the load line is critical to an accurate power model.

To capture these effects, the load line model uses a fixed point iteration to solve for the load line-adjusted voltage at the processor circuit, as shown below:

$$V_{chip}(i)=V_{eVR}-V_{eVR_{offset}}-R_{LL}*I_{eVR}(i-1),\qquad \text{(Equation 16)}.$$

$V_{eVR}$ is the voltage setting at the external voltage regulator; $V_{chip}(i)$ is the voltage at the processor chip in iteration i; $V_{eVR_{offset}}$ is a voltage offset associated with the voltage regulator; and $R_{LL}$ is the load line resistance. $I_{eVR}(i-1)$ is the current drawn by the processor from this external voltage regulator in the previous iteration. $I_{eVR}(i-1)$ is estimated using the power of the processor components supplied by this regulator and the processor circuit voltage estimated at the previous iteration. For example, if the voltage rail supplies the cores in the processor, at any iteration i, then:

$$I_{eVR}(i) = \sum_{all\ cores} \frac{\text{Core power}|_{V,F}}{V},\qquad \text{(Equation 17)}.$$

where $V = V_{chip}(i)$,

The initial condition for the iteration is, $V_{chip}(0)=V_{eVR}$. Core power$|_{V,F}$ is calculated as shown in Equation 4.

Critical path monitors (CPMs) are used in conjunction with digital phase-locked loops (DPLLs) to save energy by dynamically undervolting. CPM-DPLLs may also be used for autonomously overclocking, for a frequency and performance boost. In both scenarios, critical path monitors track timing margin within each core, allowing frequency and voltage selections tailored to the wide-and-growing process variations inherent in fabrication technology.

To save energy, power management firmware reduces the core voltage (undervolting) and monitors the core frequency realized by the CPM-DPLL mechanism. The firmware algorithm settles on the minimum voltage necessary to achieve target frequency in the managed cores. To model this, the VPM system simulator uses the load line power model to estimate the load line-adjusted voltage $V_{chip}$ at the processor cores for the current workload. The maximum frequency supported by a typical core at this voltage may then be estimated reasonably well by a polynomial curve fit to chip characterization data, for example:

$$F_{max}^{typical}(V_{chip})=aV_{chip}^2+bV_{chip}+c,\qquad \text{(Equation 18)}.$$

Core to core process variations could result in a maximum frequency for a particular core that is higher or lower than the typical. To account for this, Equation 18 can be adjusted by a process variation factor $K_c$ for core c to give:

$$F_{max}^{c}(V_{chip})=F_{max}^{typical}(V_{chip})K_c,\qquad \text{(Equation 19)}.$$

where $K_c=1\pm\epsilon$. Epsilon is typically a small fraction that represents by how much a particular core's maximum frequency deviates from the typical maximum frequency. In reality, the maximum core frequencies are influenced by their temperatures. Therefore, output of the thermal model can be incorporated into the critical path monitor model to capture this dependence.

Model Calibration

Parameters for the performance and power models come from either measurements for individual components that comprise a larger computer system, or from projections for future systems. When the VPM simulator is used to validate firmware or explore algorithm improvements for existing systems, the models can be calibrated against measurements to rectify any incorrect assumptions. For example, the performance assumptions for a workload or its memory bandwidth use may need adjustments based on hardware measurements. Parameters that involve data fitting, such as in the core power and load line models can be fine tuned once real data is available.

Variations from Example Illustrations

Embodiments do not necessarily implement a system wide VPM simulator with the models as distinct models. In other words, embodiments are not limited to implementing each model as a distinct program, routine, function, or procedure. FIG. 1 depicts the models as distinct to aid in understanding the inventive subject matter. Each of the depicted models is a logical representation of the corresponding parameters, equations, and/or functionality that expresses behavior of the modeled element. As described above, some of the depicted models comprise other models (e.g., the power model uses the thermal model). Thus, the boundaries between models are illustrative only.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. And a computer readable storage medium can be any computer readable medium that is not a computer readable signal medium.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
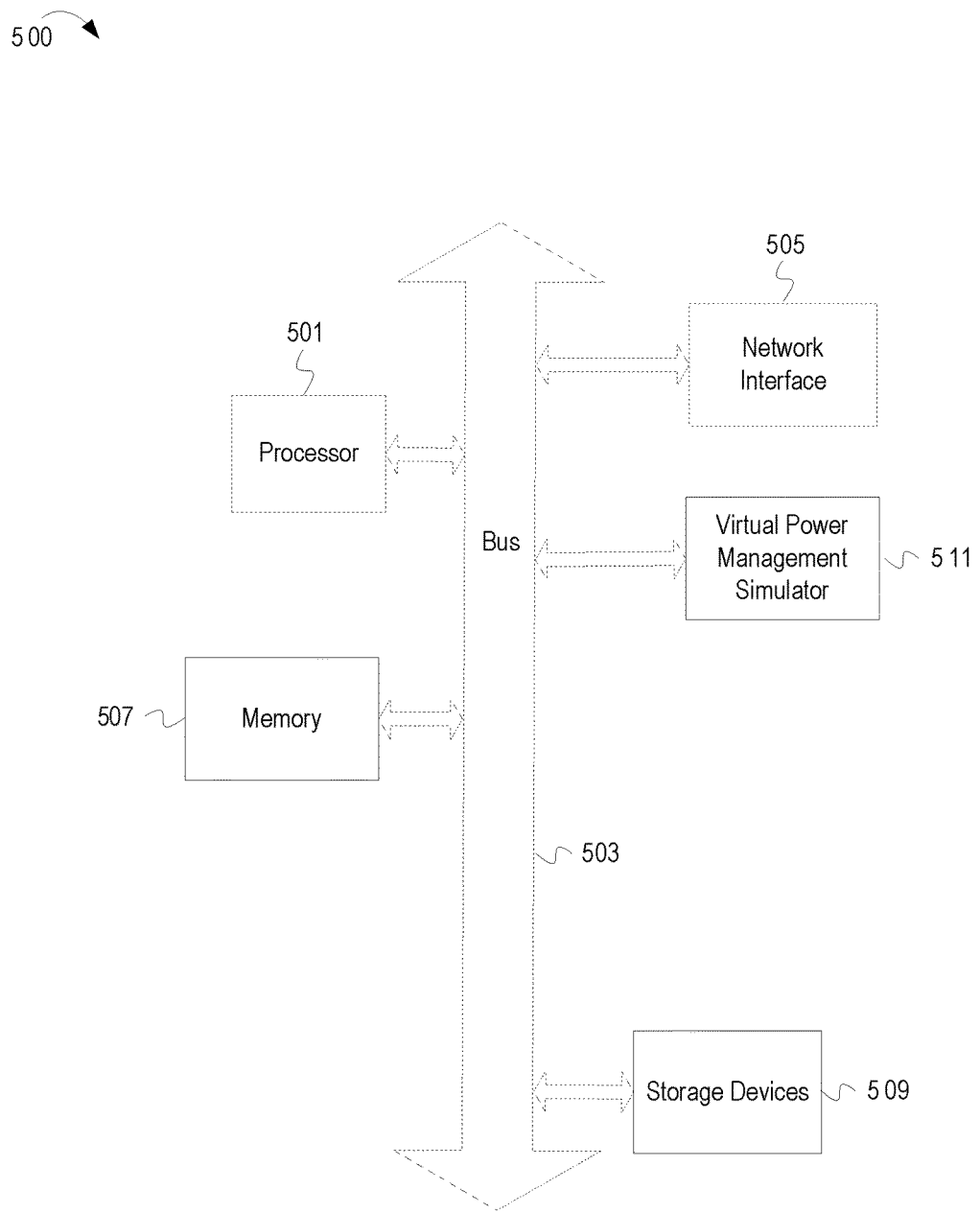
FIG. 5 depicts an example computer system with a virtual power management simulator.

FIG. 5 depicts an example computer system with a virtual power management simulator. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport® bus, InfiniBand® bus, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The example computer system also includes a virtual power management system simulator 511. This simulator 511 abstracts power related behavior of aggregates of chip-level and system level components, and simulates system wide performance with the abstractions. The abstractions are implemented as a variety of models for particular system attributes or component aggregations. Each of the models is parameterized and defined with linear and/or non-linear equations that approximate power related behavior. The simulator 511 may be partially (or entirely) implemented in hardware and/or on the processing unit 501. For example, the functionality may be implemented with an application specific integrated circuit, in logic implemented in the processing unit 501, in a co-processor on a peripheral device or card, etc. Some or all of the functionality of the simulator 511 can also be embodied in a computer readable storage medium with program code executable by the processor 501. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for efficient modeling system wide performance for power management as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components.

These and other variations, modifications, additions, and improvements may fall within the scope of the inventive subject matter.

What is claimed is:

1. A method comprising:
   generating utilization data and performance data for a simulated multi-core system with a workload model that models one or more types of workloads based on parameters that characterize the one or more types of workloads;
   generating thermal data and power consumption data for the simulated multi-core system with a power model that models power consumption at a chip-level and a system-level;
   generating performance counter information for the simulated multi-core system with a performance model that models change of performance counters over time and at least one of the generated utilization data and the generated performance data as input to the performance model; and
   providing one or more of the thermal data, the performance data, the performance counter information, the utilization data, and the power consumption data as input into an executing instance of program code that generates power management simulation events based, at least in part, on one or more of the thermal data, the performance data, the performance counter information, the utilization data, and the power consumption data;
   wherein in response to determining that one or more of the thermal data, the performance data, the utilization data, and the power consumption data indicates a feedback loop, writing model data and notifying one or more dependent models that the model data is available for use by at least one or more of the dependent models in the feedback loop.

2. The method of claim 1, wherein said providing one or more of the thermal data, the performance data, the performance counter information, the utilization data, and the power consumption data as input into the executing instance of program code that generates power management simulation events includes providing one or more of the thermal data, the performance data, the performance counter information, the utilization data, and the power consumption data as input to a full system simulator.

3. The method of claim 1, further comprising providing a power management simulation event to a simulator that includes the workload model, the power model, and the performance model, wherein at least one of the workload model, the power model, and the performance model generates corresponding data responsive to receipt of the power management simulation event.

4. The method of claim 1 further comprising requesting information from one or more of the workload model, the power model, and the performance model, wherein the workload model, the power model, or the performance model receiving the request generates corresponding data responsive to receipt of the request.

5. The method of claim 1, wherein one or more of the workload model, the power model, and the performance model generates corresponding data responsive to a power management simulation event,
   wherein said generating the utilization data and the performance data comprises running the workload model based, at least in part, on indication of the power management simulation event;
   wherein said generating the thermal data and the power consumption data comprises running the power model based, at least in part on the utilization data, the performance data, and the indication of the power management simulation event;
   wherein said generating the performance counter information comprises running the performance model based, at least in part, on the utilization data and the performance data.

6. The method of claim 5, wherein said running the workload model comprises running the workload model a number of times that corresponds to an elapsed simulation time between the power management simulation event and a preceding power management simulation event.

7. The method of claim 1, wherein said generating the thermal data and the power consumption data for the simulated multi-core system comprises generating the thermal data and the power consumption data based, at least in part, on parameters that characterize power consumption related behavior of an aggregation of chip-level components and characterize power consumption related behavior of an aggregation of system-level components.

8. The method of claim 1, wherein said generating the utilization data and the performance data for the simulated multi-core system comprises computing the utilization data and the performance data based on the parameters that characterize the one more types of workloads and a power management simulation event instead of simulating an actual workload.

* * * * *